(12) United States Patent
Morel et al.

(10) Patent No.: US 7,837,927 B2
(45) Date of Patent: Nov. 23, 2010

(54) METHOD FOR CARRYING OUT VENTILATION IN A MULTI-WALLED CONTAINER

(75) Inventors: Sabrina Morel, Chapareillan (FR); Pascal Hennemann, Vaux les Saint Claude (FR); Philippe Lautre, Oyonnax (FR)

(73) Assignee: Promens SA, Arnas (FR)

( * ) Notice: Subject to any disclaimer, the term of this patent is extended or adjusted under 35 U.S.C. 154(b) by 902 days.

(21) Appl. No.: 10/551,859

(22) PCT Filed: Mar. 26, 2004

(86) PCT No.: PCT/FR2004/000774
§ 371 (c)(1),
(2), (4) Date: Oct. 12, 2006

(87) PCT Pub. No.: WO2004/089602
PCT Pub. Date: Oct. 21, 2004

(65) Prior Publication Data
US 2007/0040306 A1 Feb. 22, 2007

(30) Foreign Application Priority Data
Apr. 2, 2003 (FR) .................................. 03 04265

(51) Int. Cl.
*B29C 49/04* (2006.01)
*B29C 49/22* (2006.01)
*B29C 49/50* (2006.01)

(52) U.S. Cl. ...................... 264/514; 264/534; 264/536; 264/540; 264/161

(58) Field of Classification Search .................... None
See application file for complete search history.

(56) References Cited

U.S. PATENT DOCUMENTS

| 4,816,093 | A | * | 3/1989 | Robbins, III | 156/69 |
|---|---|---|---|---|---|
| 5,407,629 | A | * | 4/1995 | Schmidt et al. | 264/512 |
| 6,083,450 | A | * | 7/2000 | Safian | 264/515 |
| 6,106,762 | A | * | 8/2000 | Agur et al. | 264/512 |
| 2001/0032853 | A1 | | 10/2001 | Kuehn et al. | |

FOREIGN PATENT DOCUMENTS

| EP | 0 182 094 B1 | 8/1990 |
|---|---|---|
| EP | 1 199 152 A2 | 4/2002 |
| EP | 1 043 235 B1 | 5/2003 |

* cited by examiner

*Primary Examiner*—Monica A Huson
(74) *Attorney, Agent, or Firm*—Bachman & LaPointe, P.C.

(57) ABSTRACT

A method for carrying out ventilation in a multi-walled container of the type comprising a rigid external housing, inside which a flexible inner pocket for containing a product is arranged and connected to a withdrawal device without ventilation, the layers having no adhesion between the same such as to be able to be separated without difficulty and with air ventilation between the same, characterized in being obtained by means of molding a projection at the upper or lower part of the pre-form which is subjected to a first operation of cutting a sprue, then a second operation of cutting the projection in a region close to the base and/or the neck of the recipient for production and a third operation of separating the layers.

13 Claims, 7 Drawing Sheets

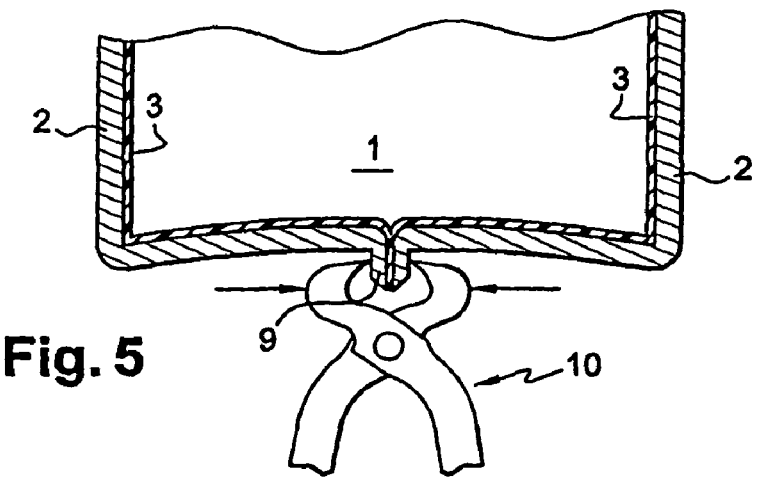
Fig. 5
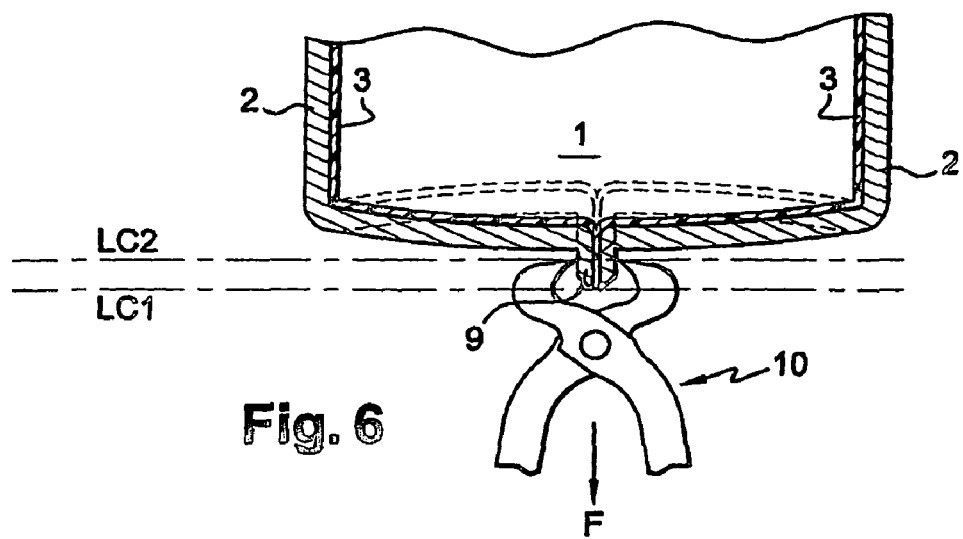
Fig. 6
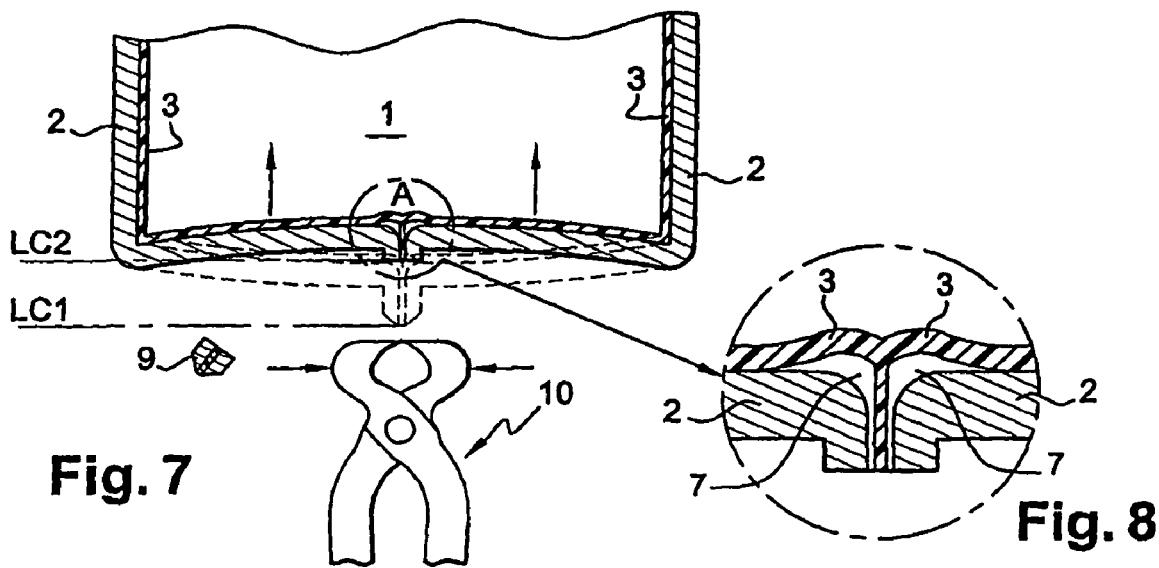
Fig. 7
Fig. 8

METHOD FOR CARRYING OUT VENTILATION IN A MULTI-WALLED CONTAINER

BACKGROUND OF THE INVENTION (1) Field of the Invention

The present invention relates to a method of producing an air inlet in a multi-walled container particularly intended to contain a liquid or thick consistency product such as is often encountered in the pharmaceutical or cosmetics industry.

These containers are of the type consisting of a rigid outer casing, inside which is placed a flexible pocket intended to contain the product and in association with a withdrawal member without air inlet, usually a pump.

Such a container is obtained in a mold by a method of blow-molding coextrusion of a parison formed of a main outer layer made of relatively rigid plastic, and a secondary inner layer, made of relatively flexible plastic.

These layers do not stick together, so as to delaminate without difficulty, after the fusion by pinching of a zone of the inner layer, then the removal of the parison residue called a sprue thus formed when the blow-molding coextrusion method is used, and finally the creation of an air inlet between the flexible layer and the rigid layer of said parison.

Specifically, when the withdrawal member is actuated in the flexible inner pocket, this pocket collapses while leaving the rigid outer casing intact.

(2) Prior Art

In the known containers of this type, there is a large number of pieces: the pocket formed by the flexible inner layer, the rigid outer casing, the withdrawal member and an interface piece between the three components.

An interface piece must then be designed to allow a correct assembly between the withdrawal member and the pocket formed by the thin inner layer in order to give sufficient rigidity to the tip of said pocket and allow a tightening and a necessary seal so that there is no leak at the tip.

An assembly and fusions between the pocket and the intermediate interface piece are therefore necessary, which incurs an additional cost.

It is also known practice to create a withdrawal member that does not allow the inlet of air into the pocket formed by the thin inner layer.

It is also a known practice to create an air inlet means between the rigid outer casing and the pocket formed by the thin inner layer.

During the withdrawal and collapsing of the pocket formed by the thin inner layer, a pressure reduction is created between the rigid outer casing and the pocket formed by the thin inner layer. This pressure reduction risks causing the rigid outer casing to collapse. To remedy this problem, it is a known practice to create a hole either in the interface piece, or in the rigid outer casing so that the outside air passes through this hole and compensates for the pressure reduction.

It is also a known practice to create the two layers in question, that is to say the rigid outer casing and the flexible inner pocket, in a single operation by multi-layer, but not delaminate, extrusion.

It is also a known practice to create two layers that do not stick together. The layers must have the following properties:
rigid outer layer,
flexible inner layer that is deformable and inert relative to the content,
use of an intermediate material that ensures delamination, where appropriate, a layer of barrier material coupled to the inner layer,
as an option, layers of bonding material or adhesive to bond the layers that must not delaminate.

Equally, it is a known practice to make a hole that pierces the rigid outer casing without piercing the pocket formed by the thin inner layer by drilling or boring, but there is then a risk of piercing and/or weakening the pocket formed by the thin inner layer. It is therefore necessary to inspect all the pieces to verify that they are in good condition. In the case of an insufficiently deep drilling, the air inlet does not operate.

In the case of an over-deep drilling, the inner layer may then be pierced, or at least be weakened in the drilling zone.

It is also a known practice to initiate the delamination to make subsequent use easier but several disadvantages appear, such as: variation of the volume of the pocket formed by the thin inner layer; air hole zone that changes the capacity; complex inlet (aspirating the pocket formed by the thin inner layer and then blowing it out again), reducing the esthetics due to the crumpling of the zone of the pocket formed by the delaminated thin inner layer.

SUMMARY OF THE INVENTION

The object of the present invention is to remedy these disadvantages and consequently it relates to a method of producing an air inlet in a multi-walled container, of the type consisting of an outer rigid casing inside which is placed a flexible pocket intended to contain a product and in association with a withdrawal member without air inlet (not shown), such a container being obtained in a mold by blow-molding coextrusion of a parison formed of a main outer layer made of relatively rigid plastic intended to form the casing and a secondary inner layer made of relatively flexible plastic intended to form the pocket, said layers having no adhesion between them so as to delaminate without difficulty, after the creation of a sprue in a portion of the parison during the blow-molding coextrusion operation, then the removal of the sprue thus formed and finally the creation of an air inlet between the flexible layer and the rigid layer of the parison, characterized in that the air inlet is obtained by making in the mold in at least one pinch zone of the parison a reservation intended to obtain a protrusion of said parison, the height of the latter being such as to allow at its end:
a first shearing operation at the sprue formed during the blow-molding coextrusion operation and having the unfortunate effect of fusing together by crushing in this zone, on the one hand, the two walls consisting of the inner layer of the parison and, on the other hand, the two walls consisting of the outer layer of the same parison,
a second operation of cutting off the protrusion by means of a cutting tool,
a third operation, subsequent to or simultaneous with the second, consisting of initiating the delamination of the layers from one another by means of a mechanical means used to exert an axial force on the protrusion in a zone close to the latter.

The present invention also relates to the features that will emerge during the following description and that must be considered in isolation or in all their possible technical combinations.

BRIEF DESCRIPTION OF THE DRAWINGS

This description, given as a nonlimiting example, will make it easier to understand how the invention may be embodied with reference to the appended drawings in which:

FIGS. 5 to 7 represent the successive phases of cutting from the container the protrusion, obtained by molding in the bottom portion, and of delaminating the protrusion by pulling vertically with a pincer.

FIG. 8 is a larger scale view of zone A of FIG. 7.

DETAILED DESCRIPTION OF THE PREFERRED EMBODIMENT(S)

Figure 1:
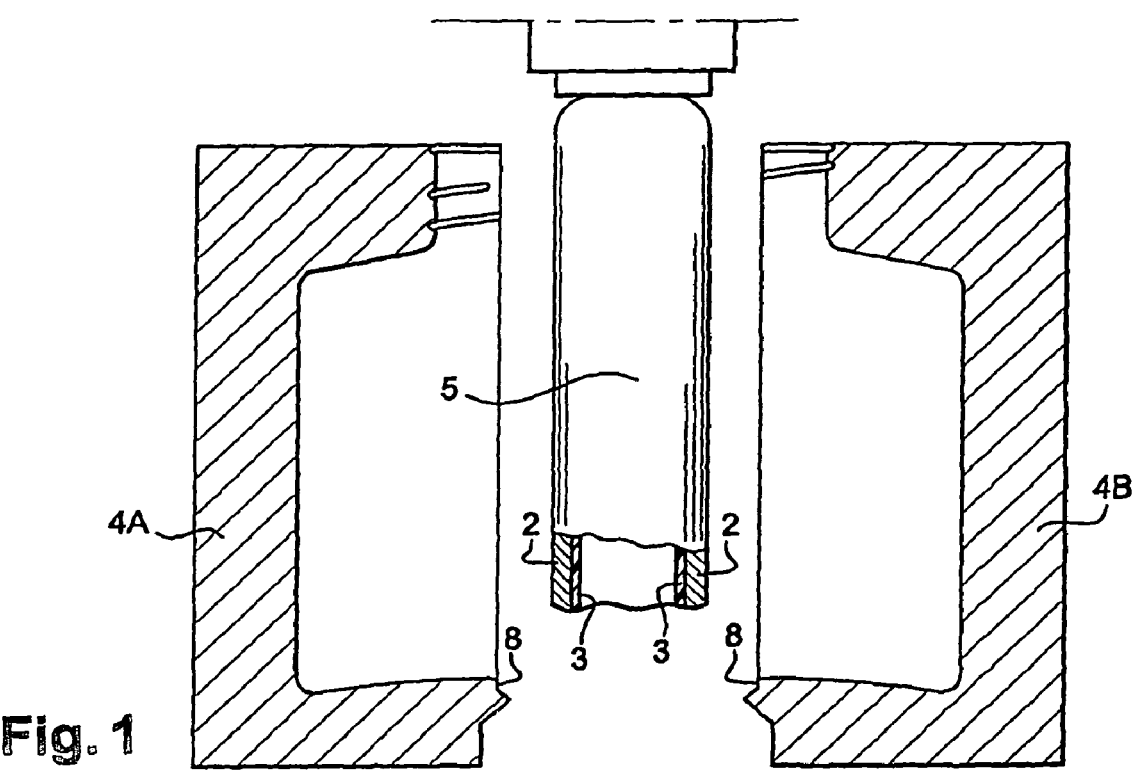
FIG. 1 represents a view in section of a two-part mold and a parison, before the mold is closed.
Figure 2:
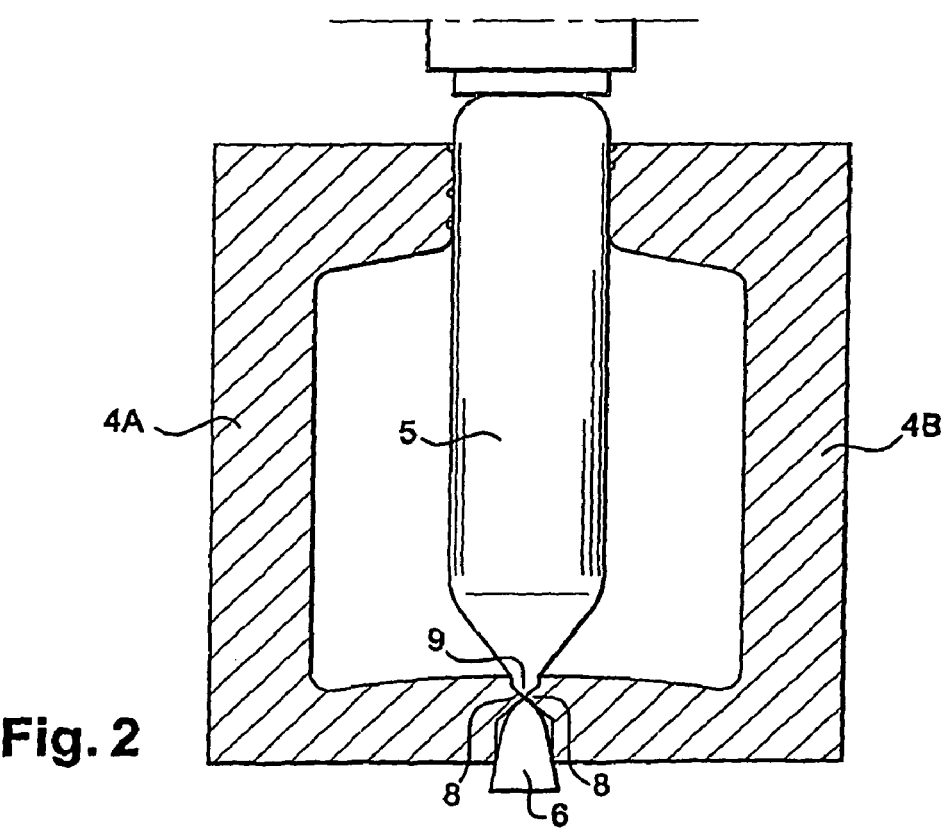
FIG. 2 represents a mold as shown in FIG. 1 after its two half-shells have been closed and the parison pinched at its bottom portion.

The multi-walled container is of the type consisting of a rigid outer casing 2 inside which is placed a flexible pocket 3 intended to contain a product and in association with a withdrawal member without air inlet (not shown), such a container being obtained in a mold 4 by blow-molding coextrusion of a parison 5 formed of a main outer layer made of relatively rigid plastic intended to form the casing 2 and a secondary inner layer made of relatively flexible plastic intended to form the pocket 3, said layers 2, 3 having no adhesion between them so as to delaminate without difficulty, after the creation of a sprue in a portion of the parison during the blow-molding coextrusion operation, then the removal of the sprue 6 thus formed and finally, creation of an air inlet 7 between the flexible layer 3 and the rigid layer 2 of the parison 5.

According to the invention, the air inlet 7 is obtained by making in the mold 4, in at least one pinch zone of the parison 5, a reservation 8 intended to obtain a protrusion 9 of said parison 5, the height of the latter being such as to allow at its end:

- a first shearing operation at the sprue 6 formed during the blow-molding coextrusion operation and having the unfortunate effect of fusing together by crushing in this zone, on the one hand, the two walls consisting of the inner layer 3 of the parison and, on the other hand, the two walls consisting of the outer layer 2 of the same parison,
- a second operation of cutting off the protrusion 9 by means of a cutting tool 10,
- a third operation, subsequent to or simultaneous with the second, consisting of initiating the delamination of the layers 2, 3 from one another by means of a mechanical means used to exert an axial force F on the protrusion 9 or in a zone close to the latter.

Such a container is therefore produced by blow-molding coextrusion consisting in extruding the parison which will be pinched between two half-shells of a mold.

A blowing iron rests on the top portion of the mold so that the tip of the container can be formed by cutting off the parison protruding from the top portion of the mold.

During this cutting operation, a portion of the inner layer of the parison is folded over onto the top portion of the formed container, allowing a better hold and a better seal of the pocket formed by the flexible inner layer at the time of the future installation of the withdrawal member.

This way the air blown through the blowing iron will block off the still hot parison so that the latter presses against the inner walls of the mold to give the external shape of the container.

The two half-shells forming the mold differ from the half-shells of a standard coextrusion mold due to the fact that a protrusion of the parison is formed for example at the bottom of the bottle so that the inner layer forming the flexible pocket can be firmly fused over a certain height while preventing the rigid outer layer from fusing on itself, due to the presence of the inner layer between the two walls of the outer layer.

As in the case of a method of producing a bottle by conventional blow-molding extrusion, the parison protruding from the bottom portion of the mold is sheared by knives integrated into the half-shells of the mold, to form a sprue, and the portion of the parison that protrudes from the top portion of the mold is sheared between the neck at the top of the mold and the blowing iron so as also to form a sprue.

The subsequent sprue removal operation consists in mechanically removing the sprues previously obtained.

In order to remove the parison residues, whether at the top or bottom portion, still attached to the bottle, a pincer or arm or sucker or any transfer system comes to collect the container from the mold in order to insert it in a template having the shape of the bottle.

The sprue removal operation consists in using a mechanical means to remove the parison residues present in the container.

The various steps of this method are as follows:

lowering the parison (5) into the mold (4), closing the mold (4) comprising a reservation (8) intended for the production of a protrusion (9) of the parison (5), a first shearing operation at the sprue (6) formed during the blow-molding extrusion operation and having the unfortunate effect of fusing together by crushing in this zone, on the one hand, the two walls consisting of the inner layer (3) of the parison and, on the other hand, the two walls consisting of the outer layer (2) of the same parison, lowering the blowing iron (30) and cutting off the tip of the container (1), blow-molding the parison (5) and cooling the latter, raising the blowing iron (30) again, opening the mold (4), reworking the container (1) by rework templates, a second operation of cutting off the protrusion (9) by means of a cutting tool (10), a third operation, subsequent to or simultaneous with the second, consisting of initiating the delamination of the layers (2, 3) from one another by means of a mechanical means used to exert an axial force on the protrusion (9) or in a zone close to the latter.

The container thus formed is complete and ready for the insertion of a liquid or thick consistency product with the top tip being closed off by a withdrawal member without air inlet.

Figure 3:
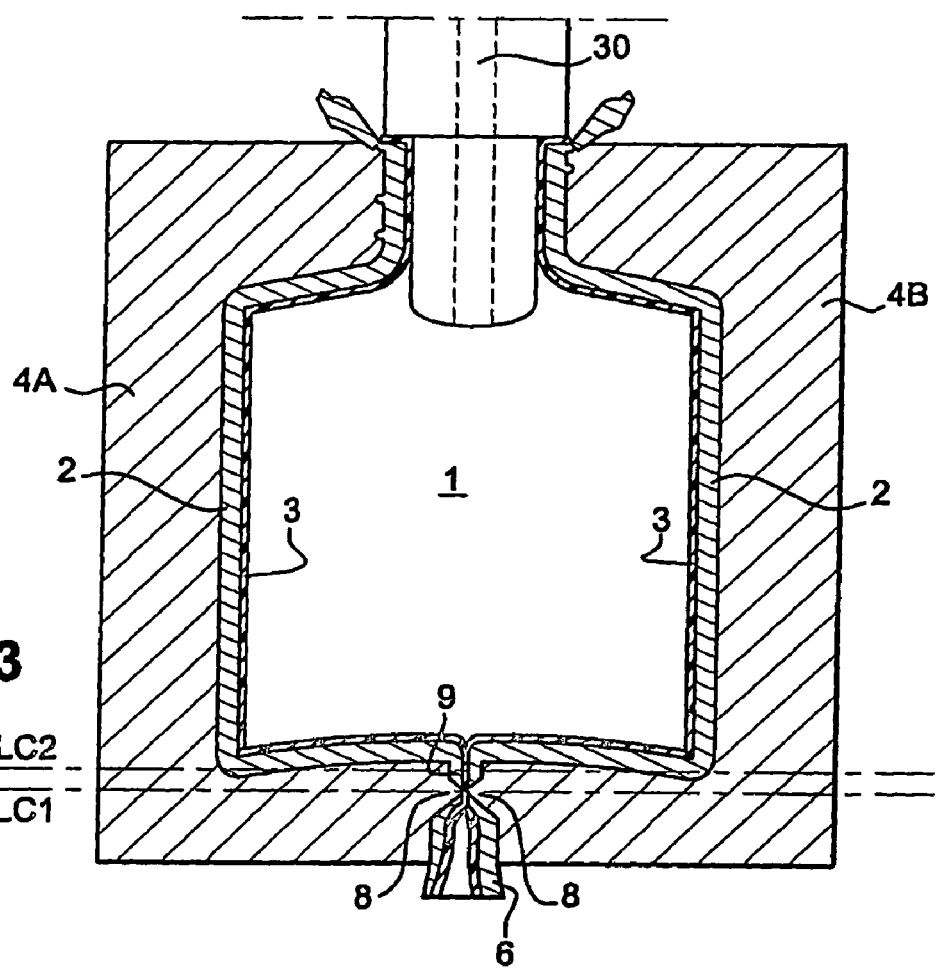
FIG. 3 represents a mold as shown in FIG. 2 after an operation of blow-molding coextrusion of the parison in the mold.
Figure 4:
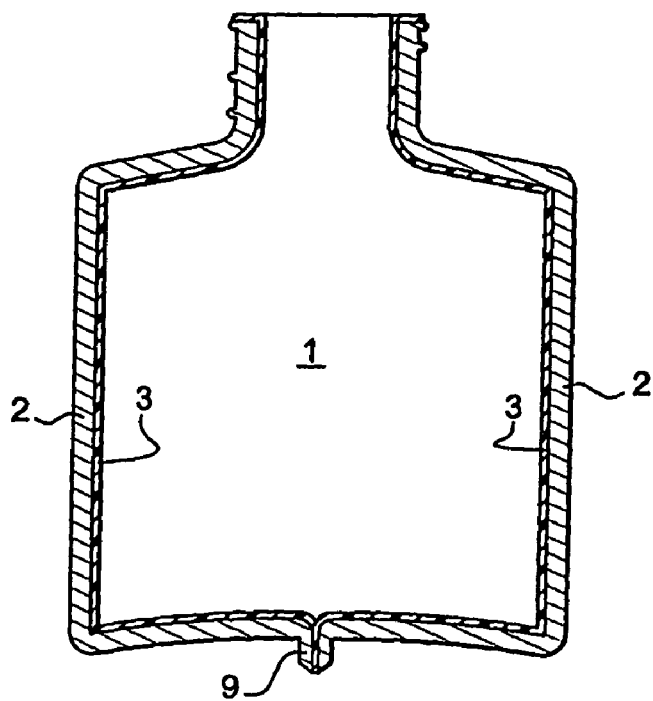
FIG. 4 represents a view in section as shown in the preceding figures of a container extracted from the mold after removal of the sprue, as shown in FIGS. 1 and 3.

Specifically, as can be seen in FIG. 3, the first shearing operation at the sprue 6 is carried out by knives 8 integrated into the mold 4.

With respect to the second shearing operation, as can be seen in FIGS. 5, 6, the second operation of cutting off the protrusion 9 is carried out by an automated or automatable cutting tool consisting of a pincer 10.

Finally, the third operation, in FIG. 7, consists in exerting an axial force F on the protrusion 9 in order to initiate the delamination of the layers 2, 3 from one another and is carried out by means of an automated or automatable cutting tool consisting of a pincer 10 by pinching the protrusion, pulling it in the axial direction and then carrying out the second cutting operation.

Figure 9:
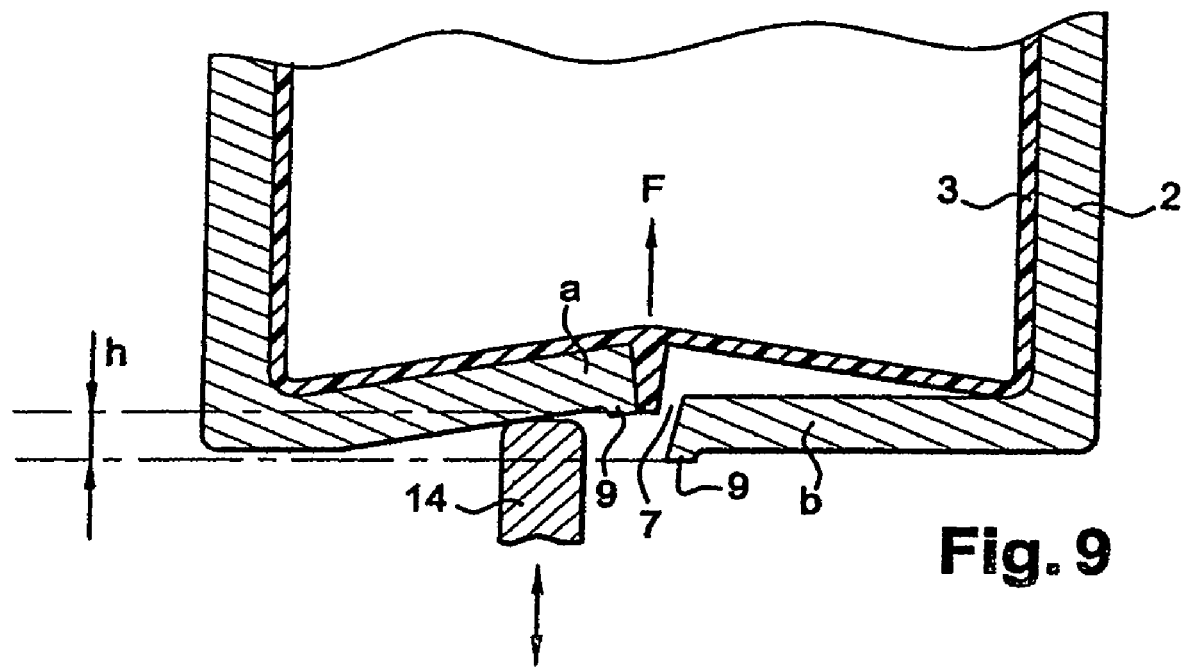
FIGS. 9 to 10 represent successive phases of initiating a delamination according to a second exemplary embodiment.
Figure 10:
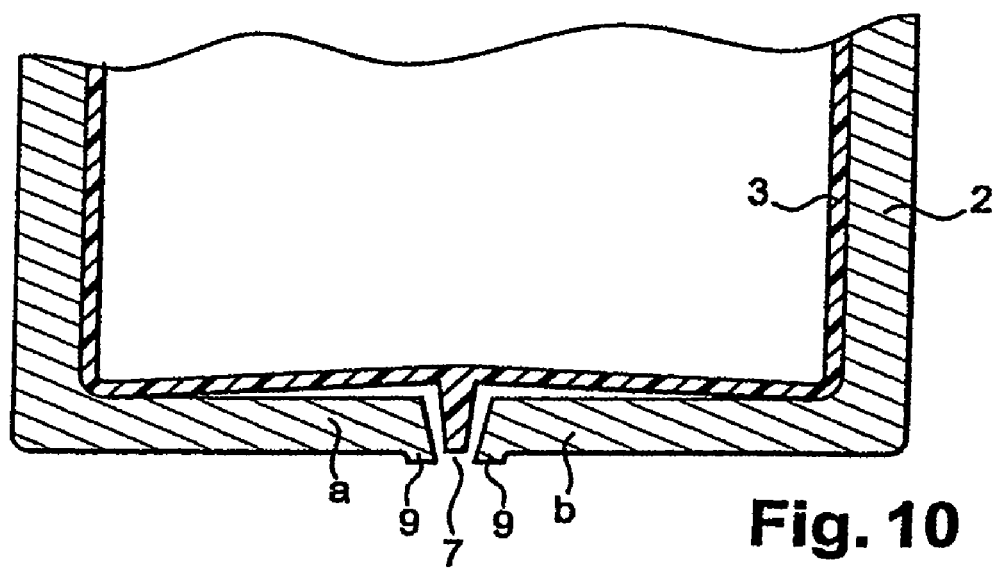

According to a second variant, in FIGS. 9 and 10, the third operation consisting in exerting an axial force F on the protrusion 9 in order to initiate the delamination of the layers 2, 3 from one another, is carried out by deforming a portion a of the zone bordering the protrusion 9 by means of a post 14 located in the mold 4 or during the removal of the sprue, said post 14 being capable of generating a difference in height h with another portion b of the zone bordering the protrusion 9, so as to separate the inner layer 3 from the outer layer 2 and create an air inlet zone 7 between the inner and outer layers.

Figure 11:
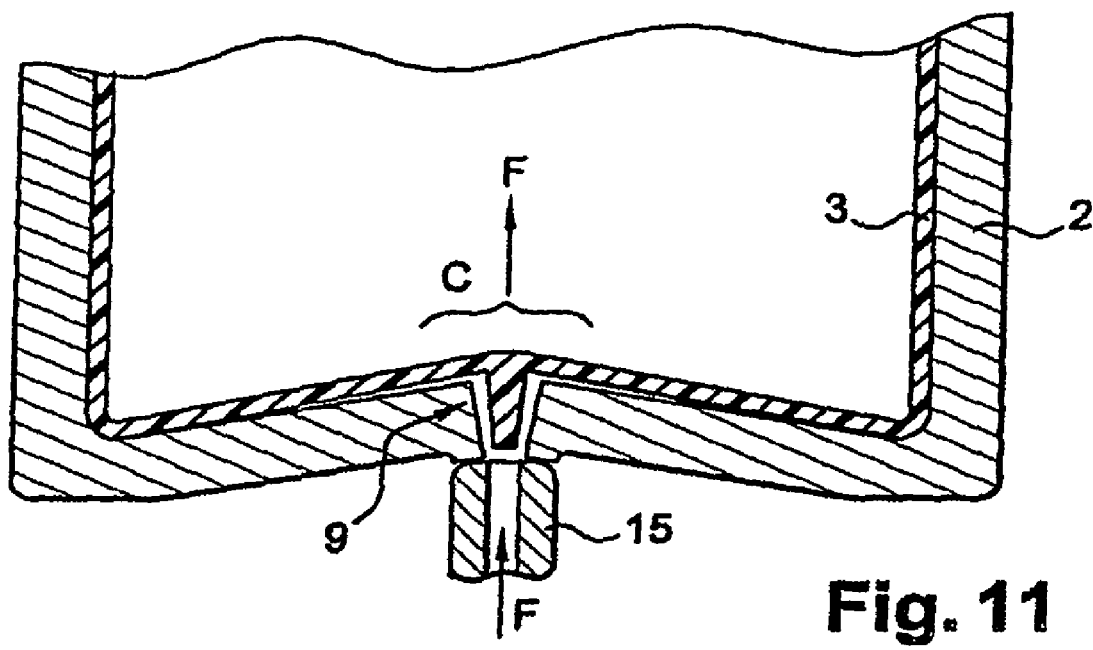
FIGS. 11 and 12 represent the successive phases of initiating a delamination according to a third exemplary embodiment.
Figure 12:
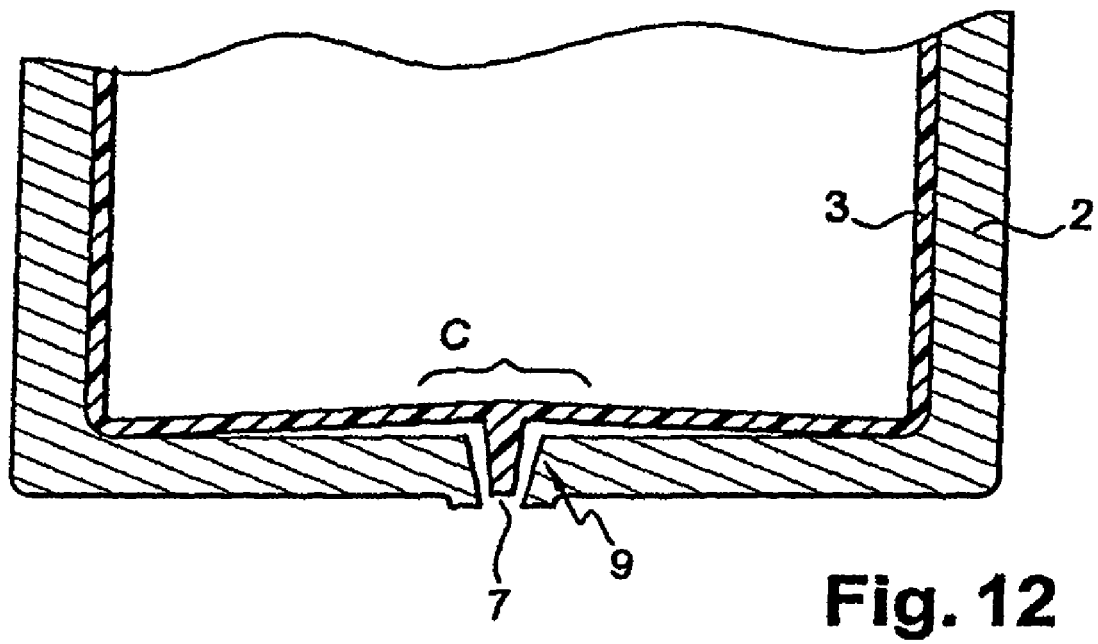

According to a third variant, in FIGS. 11 and 12, the third operation consisting in exerting an axial force F on the protrusion 9 in order to initiate the delamination of the layers 2, 3 from one another is carried out by deforming a portion c of the zone surrounding the protrusion 9 by means of a first blowing iron 15 tending to separate the two walls 2, 3 by blowing pressurized air, infiltrating itself between the outer casing 2 and the inner flexible pocket 3 to delaminate the two walls 2, 3 over a given height.

According to the latter embodiment, a second blowing iron (not shown) comes successively to blow pressurized air, at the top tip of the container, to check that the pocket 3 is sealed and make it possible to press it against the outer casing 2 so that it resumes its shape and its initial capacity.

It should be noted that the protrusion is made in the bottom portion of the container and/or at the top portion of the container in the zone of a tip.

In order to improve the delamination, more particularly in the zone of the protrusion 9 being crushed when the sprue 6 is created, agents are added to one and/or other constituent material of the container in order to make it easier to separate the two layers 2, 3 formed by the inner flexible wall and the outer rigid wall or in order to prevent them fusing together when they are crushed.

The agents used to improve the non-fusion at the protrusion 9 are dispersant and slippery lubricating agents (erucamide, silicone and stearate compounds).

Preferably, the outer layer 2 forming the rigid casing and the inner layer 3 forming the flexible pocket are made respectively of polypropylene and polyethylene that do not stick together.

Advantageously, the outer layer 2 of the parison 5 represents 80%±10% of the total thickness of the parison 5 and the inner layer 3 20%±10%, so as to make the first rigid and the second collapsible relative to the latter.

The protrusion 9 and consequently the corresponding reservation 8 of the mold 4, in terms of length, width, height and profile, are defined according to the materials used and the shape to be obtained.

According to another feature of the invention, the mold 4 consisting of two half-shells 4A, 4B comprises, in its parting line, longitudinal extensions 11 made over a predetermined height, so as to allow the flexible inner layer 3 to be pinched in the rigid outer layer 2, preventing the first from delaminating from the second in this zone and thus to force, during the use of the container 1, a delamination of the flexible pocket 3 from the rigid casing 2 in a direction perpendicular to said parting line.

These grooves may vary in number and position in order to optimize the collapsing of the pocket 3 formed by the flexible inner layer.

According to another feature of the invention, the parison 5 comprises at least one rib 12 made longitudinally on the inner periphery of the flexible pocket 3, so as to make it easier to empty the latter by making it retract about a central axis corresponding to that of the withdrawal member (not shown) and where necessary that of its plunger tube (not shown) and consequently collapse along zones of preferred pleats and thus make it easier to empty the pocket 3 in use.

According to a nonlimiting exemplary embodiment, the withdrawal member consists of a pump without air inlet (not shown) comprising a plunger tube extending it inside the pocket 3 and of a length such that the withdrawal of product is not hampered by the collapsing of said pocket 3, thus allowing a maximum delivery of the contained product.

As is clearly shown in the figures, the bottom of the mold 4 has a shape optimized so as to assist with the continued delamination initiated between the rigid layer 2 and the flexible layer 3 when the air inlet 7 is created.

Figure 13:
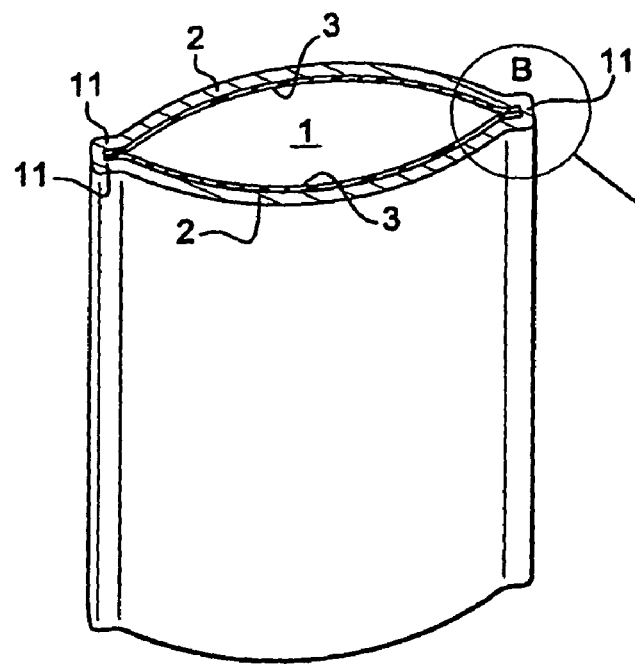
FIG. 13 is a view in perspective showing a particular embodiment of the half-shells of the mold in order to create longitudinal pinchings of the parison.
Figure 14:
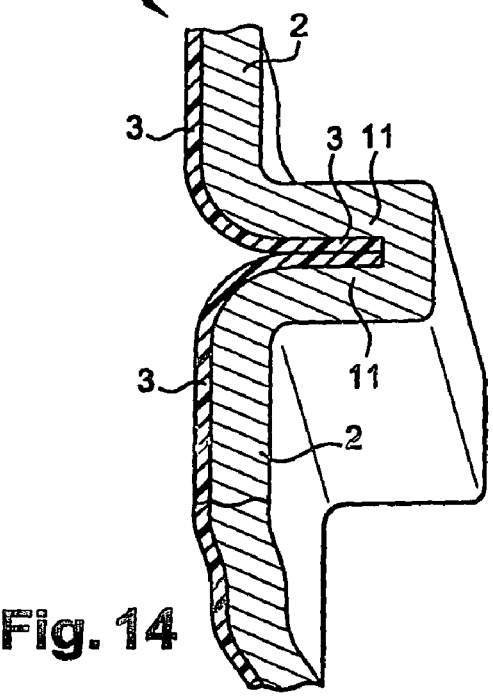
FIG. 14 is a larger scale view of the detail B of FIG. 13.
Figure 15:
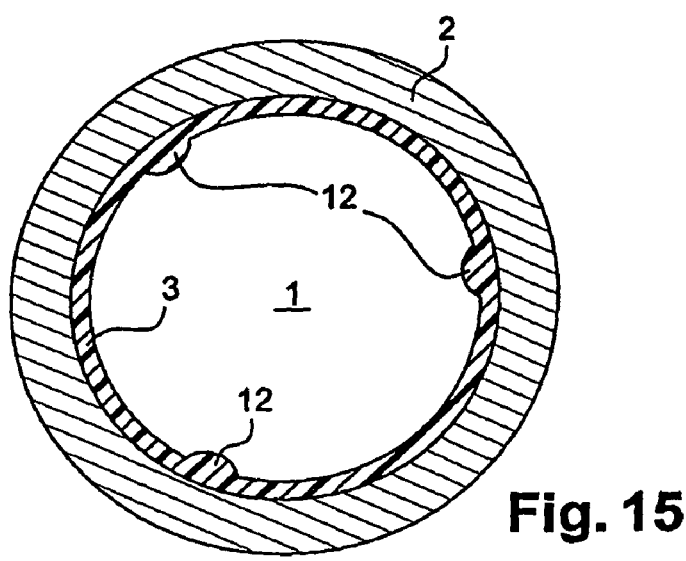
FIG. 15 is a view in cross section of a parison whose flexible pocket comprises internal longitudinal ribs.
Figure 16:
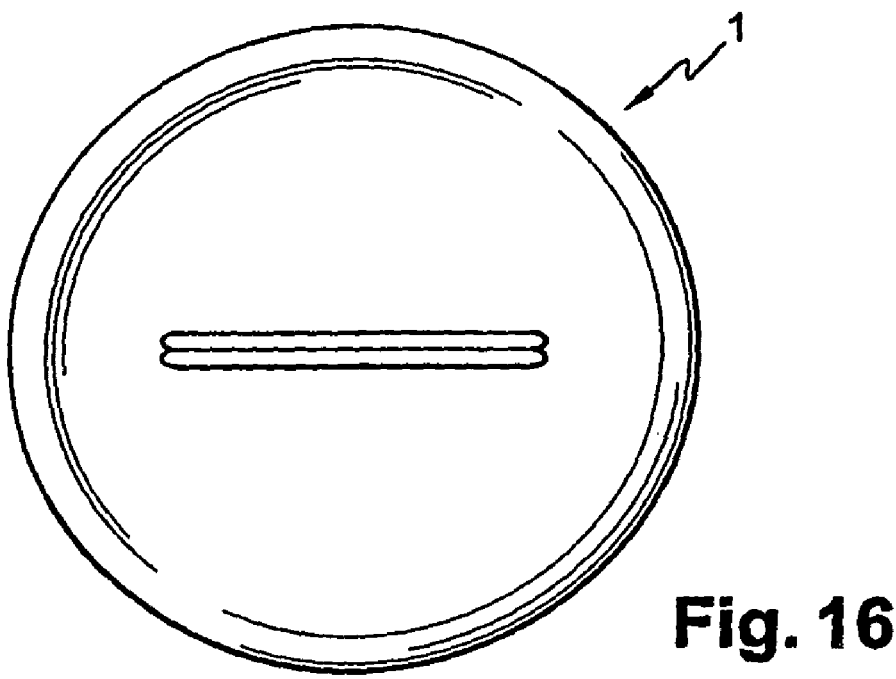
FIG. 16 represents the external bottom of a circular container.
Figure 17:
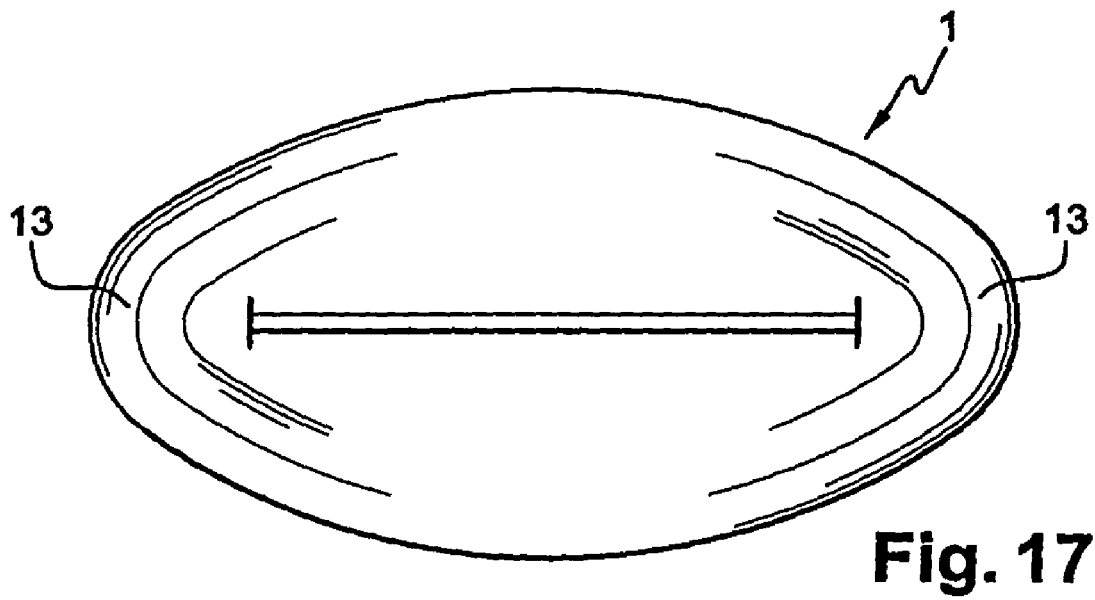
FIG. 17 is a view of the bottom of a generally oval container.

According to a feature of the invention shown in FIG. 13, the bottom of the mold 4 is dished outward and comprises at least two diametrically opposed appendages intended to form support studs 13 of the container 1 in order to provide stability for the latter, despite its dished bottom.

These support studs are located on the bottom of the container so as not to hamper the initiation of the delamination.

According to a variant embodiment, each layer of the parison 5, rigid and/or flexible, consists of several strata forming subassemblies, each of the latter being able to be delaminated from the other.

According to another feature of the invention, the constituent material of the outer rigid casing is made porous by means of fillers or additives added to the material, in order to improve the continued delamination on the walls of the container by allowing the outside air to penetrate more easily between its two constituent layers.

The invention claimed is:

1. A method of producing an air inlet in a multi-walled container of the type consisting of an outer rigid casing inside which is placed a flexible pocket intended to contain a product and in association with a withdrawal member without air inlet, such a container being obtained in a mold by blow-molding coextrusion of a parison formed of a main outer layer made of relatively rigid plastic intended to form the outer rigid casing and a secondary inner layer made of relatively flexible plastic intended to form the flexible pocket, said layers having no adhesion between them so as to delaminate without difficulty, after the creation of a sprue in a portion of the parison during the blow-molding coextrusion operation, then removal of the sprue thus formed and finally the creation of an air inlet between the flexible layer and the rigid layer of the parison, the air inlet being obtained by making in the mold in at least one pinch zone of the parison a reservation intended to obtain a protrusion of said parison, the height of the protrusion being such as to allow at its end a first shearing operation at the sprue having the effect of fusing by crushing in this zone, two walls consisting of the outer layer with two walls consisting of the inner layer a second operation of cutting off the protrusion by means of a cutting tool, after opening of the mold and reworking of the container by rework templates, and a third operation, subsequent to or simultaneous with the second operation, consisting of initiating the delamination of the layers from one another by means of a mechanical means, wherein the initiation of the delamination is realized by exerting an axial force on the protrusion in a zone close to the latter.

2. The method as claimed in claim 1, wherein the first shearing operation at the sprue is carried out by knives integrated into the mold.

3. The method as claimed in claim 1, wherein the second operation of cutting off the protrusion is carried out by an automated or automatable cutting tool consisting of a pincher.

4. The method as claimed in claim 1, comprising making the protrusion in a bottom portion of the container.

5. The method as claimed in claim 1, further comprising providing a mold consisting of two half-shells comprising, in a parting line, longitudinal extensions made over a predetermined height, so as to allow the flexible inner layer to be pinched in the rigid outer layer, preventing the first layer from delaminating from the second layer in this zone and thus forcing, during use of the container, a delamination of the flexible pocket from the rigid casing in a direction perpendicular to said parting line.

6. The method as claimed in claim 1, wherein a bottom providing step comprises dishing outwardly the bottom of the mold and forming at least two diametrically opposed appendages intended to form support studs of the container in order to provide stability for the container, despite its dished bottom.

7. The method as claimed in claim 1, comprising making a constituent material of the outer rigid casing porous by means of fillers or additives added to the material, in order to improve continued delamination of the walls of the container by allowing outside air to penetrate more easily between said two constituent layers.

8. The method as claimed in claim 1, wherein the third operation of initiating the delamination is carried out by means of an automated or automatable cutting tool consisting of a pincher by pinching the protrusion, pulling it in the axial direction and then carrying out the second cutting operation.

9. The method as claimed in claim 1, wherein the third operation of initiating the delamination is carried out by deforming a portion of the zone bordering the protrusion by means of a post located in the mold or during the removal of the sprue, said post being capable of generating a difference in height with another portion of the zone bordering the protrusion, so as to separate the inner layer from the outer layer and create the air inlet zone.

10. The method as claimed in claim 1, wherein the third operation of initiating the delamination is carried out by deforming a portion of the zone surrounding the protrusion by means of a first blowing iron tending to separate the two walls by blowing pressurized air, infiltrating itself between the outer casing and the inner flexible pocket.

11. The method as claimed in claim 10, wherein, successively to the third operation of initiating the delamination, a second blowing iron comes to blow pressurized air, at a top tip of the container adapted to receive the withdrawal member, to check that the pocket is sealed and make it possible to press it against the outer casing so that it resumes its shape and its initial capacity.

12. The method as claimed in claim 1, wherein the parison comprises at least one rib made longitudinally on the inner periphery of the flexible pocket, so as to make it easier to empty the latter by making it retract about a central axis corresponding to that of the withdrawal member and consequently collapse along zones of preferred pleats and thus make it easier to empty the pocket in use.

13. The method as claimed in claim 1, further comprising, in order to improve the delamination in a zone of the protrusion being crushed when the sprue is created, adding agents to at least one constituent material of the container in order to make it easier to separate the two layers formed by an inner flexible wall and an outer rigid wall or in order to prevent the walls from fusing together when they are crushed.

* * * * *